July 31, 1934.  D. J. STEWART  1,968,325
CONTROL FOR AIR CONDITIONING SYSTEMS
Original Filed July 18, 1931
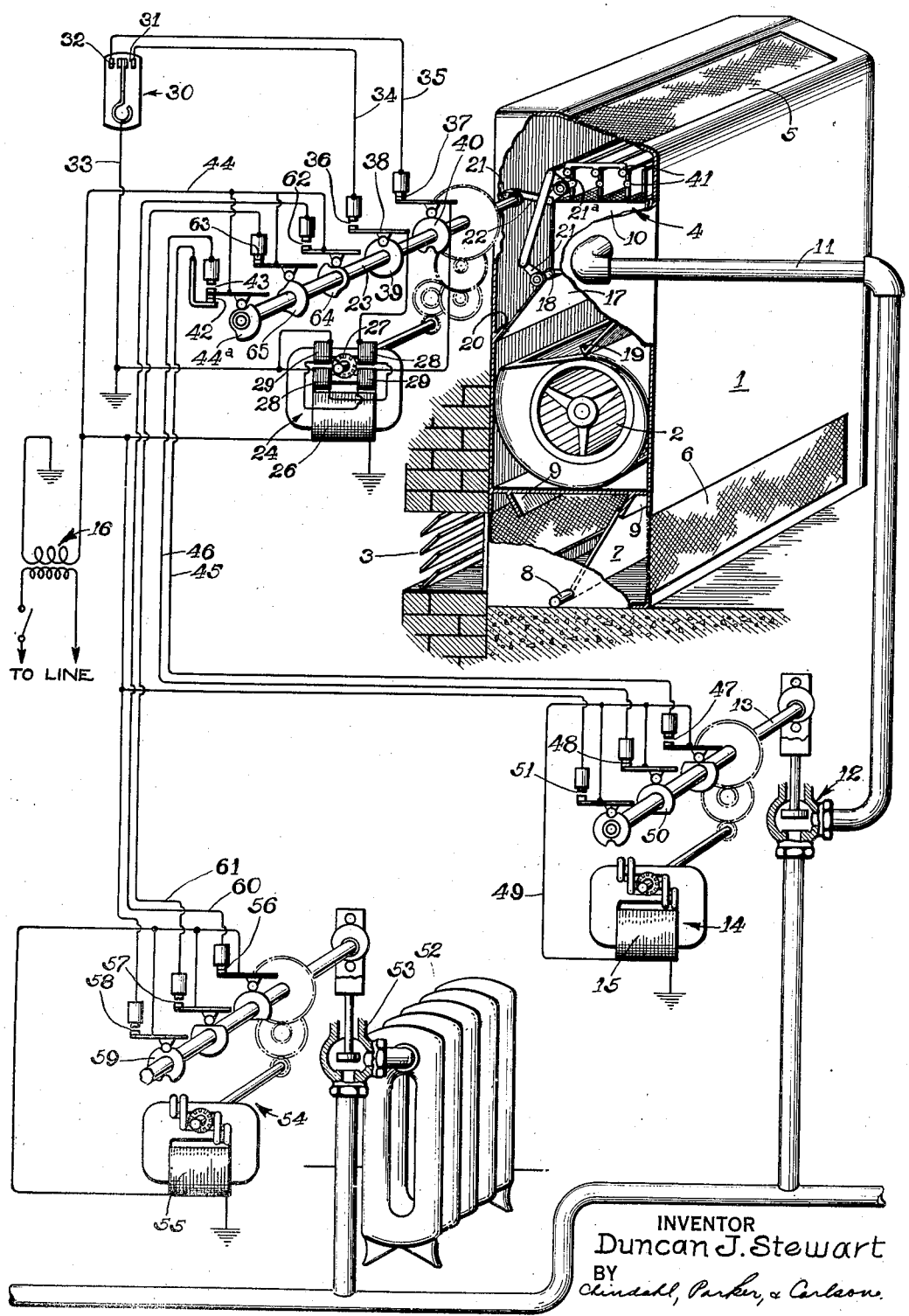
INVENTOR
Duncan J. Stewart
BY
Chindahl, Parker, & Carlson.
ATTORNEYS Patented July 31, 1934

1,968,325

UNITED STATES PATENT OFFICE 1,968,325

CONTROL FOR AIR CONDITIONING SYSTEMS

Duncan J. Stewart, Rockford, Ill., assignor to Howard D. Colman, Rockford, Ill.

Application July 18, 1931, Serial No. 551,663
Renewed September 15, 1933

28 Claims. (Cl. 236—38)

This invention relates to the control of regulating devices by sensitive control instruments and has more particular reference to the control of such devices in air conditioning systems.

One object of the invention is to provide a novel system of control for governing the operation of a plurality of inter-related regulating devices in response to one sensitive automatic control instrument such as a thermostat.

Another object is to provide in a heating system of the so-called unit ventilator type, a new and improved means for governing the operation of the heater through which incoming air is warmed before being discharged into the room to be heated.

A further object is to combine with a unit ventilator type of heating system a novel control for an auxiliary supply of heat.

Other objects and advantages of the invention will become apparent from the following detailed description taken in connection with the accompanying drawing which is a schematic view of a combined heating and ventilating system embodying the features of the present invention.

In this exemplary system, which is for the purpose of heating the air in a room, heat is compose of heating the air in a room, heat is conveyed to the room by air forced through a casing 1 by a power driven blower 2. Within the casing, fresh air entering through an inlet opening 3 is heated to the proper degree by causing a part thereof to pass through a heater 4, the resulting mixture of hot and cold air being discharged through an outlet opening 5. If desired, part of the incoming air may be taken from the surrounding room through an opening 6 and the proportion of the air thus re-circulated is determined by the position of a damper 7 pivoted at 8 to swing between two limit positions determined by abutments 9.

The heater 4 may be in the form of a coil enclosed by a casing 10 and supplied with heated fluid from a pipe 11 leading from a source of supply and having a control valve 12 interposed therein. Herein this valve is arranged to be opened and closed in successive half revolutions of a cam shaft 13 arranged to be driven from an electric motor 14 preferably of the shading ring induction type and adapted to operate uni-directionally whenever its winding 15 is energized from a source 16 of alternating current.

The proportion of the incoming air by-passed around the heater 4 and therefore the temperature of the resulting mixture is determined by a valve-member in the form of damper 17 pivoted at 18 to swing between a position against an abutment 19 in which all of the incoming air is by-passed around the heater and the position shown against an abutment 20 in which all of the air flowing through the casing 1 is forced through the heater.

Through the medium of cranks 21, a bell-crank 21ª, and links 22, the damper 17 is actuated from a shaft 23 having a speed reduction gearing connection with an electric driving means capable of moving the shaft variable distances in opposite directions between two positions corresponding to the limit positions of the damper. Preferably the driving means is a reversible electric motor 24 which herein is of the induction type forming the subject matter of a co-pending application Serial No. 540,643, filed May 28, 1931, by Edgar D. Lilja. Briefly the motor comprises a stator of the core type enclosed by a main winding 26 and defining two poles on opposite sides of a rotor 27 of the squirrel-cage type preferably having inductor bars exposed at the surface of the rotor core. Shifting of the magnetic field around the rotor when the winding 26 is excited by alternating current is produced by the well-known action of the shading rings each enclosing one side portion of one motor pole and comprising in the present instance a relatively large number of turns of wire. The coils are arranged in pairs 28 and 29 with the coils of each pair disposed on diametrically opposite sides of the rotor and connected in series relation.

From the well-known action of such shading coils, it will be seen that when the coils 28 are rendered effectual by short-circuiting the same, the magnetic flux threading the sections of the poles enclosed by these coils will lag behind the flux in the unshaded sections enclosed by the then ineffectual coils 29 with the result that the magnetic field will shift around the rotor in a counter-clockwise direction and produce rotation of the rotor in the same direction. In a similar way, clockwise rotation is produced by short-circuiting the coils 29 while the coils 28 remain ineffectual. Owing to the poor single phase characteristics possessed by the motor above described, rotation of the motor will cease when the circuits for both pairs of coils are interrupted and the position of the damper will be maintained by the friction in the speed reduction gearing.

It will be apparent that the driving means above described has two windings 28 and 29 which determine the starting and the direction of movement of the damper. Selective short-circuiting of these windings is effected in accordance with temperature changes detected by a thermostat 30 having two switches 31 and 32 with a common terminal connected by a conductor 33 to each pair of shading coils. The insulated switch terminals of the thermostat are spaced apart so that both switches may be opened and both sets of shading coils thus rendered ineffectual simultaneously. These are connected respectively to the insulated ends of the coils 28 and 29 by conductors 34 and 35 in which are interposed switches 36 and 37 respectively. The winding 26 is constantly energized from the alternating current source 16.

From the foregoing it will be seen that when the thermostat is calling for heat the switch 31 will be closed and the coils 28 short-circuited to initiate rotation of the motor in a direction to advance the damper 17 toward the abutment 20 and allow more air to be by-passed through the heater 4. The rate of delivery of heat to the room to be heated will thus be increased progressively with the movement of the damper. When the proper room temperature is attained, the switch 31 is opened and the motor comes to rest with the damper in position to maintain the proper temperature of the outgoing air. In a similar way, closure of the switch 32, when the room temperature rises above that for which the thermostat is set, starts the motor in a direction to move the damper toward the abutment 19 thereby causing the heating capacity of the primary heater and therefore the temperature of the mixed air to be decreased. In this way the thermostat governs the extent of movement of the damper 17 as well as the direction thereof, and the damper will oscillate through variable distances between its limit positions depending on the heating requirements of the room. An equilibrium rest position will eventually be established automatically when both shading coil circuits become opened and this position will be maintained until there is a change in the heating requirements of the room.

The movable contact of the switch 36 is on the follower 38 of a cam 39 fast on the shaft 23 and shaped to allow the switch 36 to open as shown in the drawing when the damper 17 reaches its limit position against the stop 20. This interrupts the circuit through the thermostat switch 31 so that even though the thermostat continues to call for heat the shading coils 28 are maintained ineffective and further application of motive power tending to move the damper toward the stop 20 is prevented. The switch 37 is controlled in a similar way by a cam 40 and allowed to open when the damper reaches its other limit position against the stop 19.

If desired, a separate damper 41 mounted at the outlet end of the heater casing 10 may be operated from the shaft 23 conjointly with the damper 17 so as to be closed when the damper is positioned against the stop 19 and open when the main damper is positioned as shown in the drawing. In the present instance, one of the vanes of this damper is rigid with the bell-crank 21a, and all of the vanes are connected together to operate in unison.

If the room remains overheated for an interval sufficiently long to allow the damper 17 to reach its limit position against the abutment 19, there is no need for supplying fluid to the heater 4 and in fact it is desirable, for the sake of economy and accurate regulation of the room temperature, to interrupt this supply under such a condition. This result is attained in accordance with the present invention by opening and closing the valve 12 automatically as an incident to the movement of the damper 17 into and out of its limit position against the abutment 19. For this purpose, two switches 42 and 43 are employed which control the initiation of successive operating cycles of the electric operator for the valve 12 during which cycles the valve is alternately opened and closed.

The switches 42 and 43 have a common contact which is connected to the power source 16 by a conductor 44 and insulated contacts connected by conductors 45 and 46 to two switches 47 and 48 respectively having common contacts joined by a common conductor 49 to the winding 15, the other terminal of which is connected to the grounded side of the current source 16. The common contact of the switches 42 and 43 is carried on the follower of a cam 44a which is shaped to allow the switch 43 to open and the switch 42 to close as the damper 17 moves away from the stop 19 and to maintain this condition of these switches for all other positions of the damper. Thus the switch 42 is opened and the switch 43 closed as the damper reaches the stop 19 in closing off the passage through the heater.

Closure of the switch 43 completes a starting circuit through the conductor 46 and the switch 43 which, in the open position of the valve 12, is held closed by a cam 50. The motor 14 is thus started and the switch 48 is held closed until after closure of a switch 51 in a maintaining circuit for the motor 14, which latter circuit continues the operation of the motor 14 until the valve has been completely closed whereupon the switch 51 is opened and the operation of the motor 14 interrupted, and the fixed cycle of operation of the valve operator is thereby terminated. When the thermostat 30 again calls for heat and the shading coils 28 are short-circuited to initiate movement of the damper 17 away from the abutment 19, the cam 44a allows the switch 42 to close completely a circuit for the motor winding 15 through the conductor 45 and a switch 47, which is closed during the valve-closing movement of the shaft 13 to prepare the starting circuit for the valve-opening cycle. The motor 14 thus runs causing a valve-opening cycle of the operator to be executed. The maintaining switch 51 also controls the termination of this cycle after the switch 47 in the starting circuit has been opened. The shaft 13 is thus stopped and remains in valve-open position so long as the switch 42 remains closed. In this condition no heating fluid will be supplied to the coil of the heater 4.

Closure of the thermostat switch 32 for a period long enough to enable the damper 17 to be moved against the abutment 20 indicates that the heater 4, when operating at its maximum heating capacity, is incapable of delivering heat at the rate required in order to satisfy the requirements of the room. Such movement of the damper is utilized in the present instance as an indication that the primary heater has reached its maximum capacity and is incapable of meeting the existing heating requirements. In response to this indication means is provided for rendering available an auxiliary source of heat supply. Herein this source is in the form of a radiator 52 which is rendered effective and ineffective by opening and closing a fluid supply valve 53 which is actuated by an electric operator 54 constructed the same as the operator for the valve 12. The starting circuits for the motor winding 55 of the operator 54 are prepared by the closure of the switches 56 and 57 as the valve reaches open and closed positions respectively.

Each cycle of the operator 54 is terminated by opening a maintaining switch 58 which is closed by a cam 59 shortly after the initiation of each cycle of the operator. The switches 56 and 57 are connected by conductors 60 and 61 to switches 62 and 63 respectively. When the damper is positioned between the abutments 19 and 20, a cam 64 on the shaft 23 holds the switch 62 closed but opens this switch as the damper 17 reaches the abutment 20 in closing off the passage around the heater casing 10. Simultaneously with the opening of the switch 62, a cam 65 closes the switch 63 completing a circuit through the conductor 61 and the then closed switch 57 of the operator 54 which initiates a cycle to open the valve 53 causing more heat to be supplied to the room by rendering the radiator 52 effective. Then when an overheated condition of the room is detected by the thermostat 30 and the damper 17 starts to move away from the abutment 20, the closure of the switch 62 as above described completes a circuit through the conductor 60 and the switch 56 for initiating a valve-closing cycle of the valve operator 54. In this way the radiator 52 is maintained ineffective except when the heat requirements of the room exceed the capacity of the heater whereupon the auxiliary heat supply is turned on.

From the foregoing, it will be apparent that an extremely simple and reliable control for related regulating devices has been provided, the power for actuating the control for one auxiliary operator being derived from another operator controlled directly by a sensitive control instrument such as the thermostat 30. Thus, the operator which controls the direction and extent of movement of the damper 17 in response to the thermostat 30 operates the switches for initiating the predetermined closing and opening cycles of the heater valve operator as the damper moves into and out of full cooling position against the abutment 19 and operates similar switches for initiating successive valve opening and closing cycles of the operator 54 as an incident to the movement of the damper into and out of full heating position against the abutment 20. In this way, the different controls are coordinated with each other and governed by the action of a single thermostat which arrangement not only reduces the amount of equipment required but also enables the different control functions to be performed accurately and reliably and the necessary adjustments to be made conveniently and retained permanently. The control is especially advantageous in that the auxiliary regulating devices are operated in response to a continuation rather than an aggravation of the temperature in the room with the result that the heating coil 4 is rendered ineffectual and the secondary heater is rendered effectual independently of temperature fluctuations in the space being heated. That is to say, if the thermostat 30 is set for 70 degrees F., a temperature of 69 degrees will cause the rate of delivery of heat by the primary heater to be increased progressively and continuance of this same temperature will cause the secondary heater to be turned on as the maximum capacity of the primary heater is reached.

I claim as my invention:

1. In a temperature control system, the combination of a casing adapted for the circulation of air therethrough, an enclosed heater coil within said casing, a damper movable between one position in which all of the air passing through the casing is subjected to said heater and a second position in which all of the air is by-passed around said heater, a power operator for actuating said damper including an electric motor, a thermostat controlling said motor to determine the direction and extent of movement of said damper, a valve controlling the flow of heating medium to said coil, a motor driven power operator adapted to execute successive operating cycles of fixed length during which said valve is alternately opened and closed, a second heater outside of said casing, a power operator adapted to execute successive operating cycles of fixed length to alternately interrupt and resume the operation of said second heater, means actuated by said first mentioned operator and operating as an incident to the movement of said damper into and out of said second mentioned position to initiate valve-closing and valve-opening cycles of said second operator respectively, and means actuated by said first mentioned operator as an incident to the movement of said damper into and out of said first mentioned position to initiate cycles of said third operator for rendering said second heater effectual and ineffectual respectively.

2. In a temperature control system, the combination of a casing adapted for the circulation of air therethrough, a heater, a damper controlling the flow of air through said heater, a power operator for moving said damper between one position in which all of the air passing through the casing is subjected to said heater and a second position in which substantially none of such air is so subjected, a thermostat controlling said operator to determine the direction and extent of movement of said damper, a second heater for supplying heat to the air outside of said casing, means actuated by power derived from said operator and operable as an incident to the movement of said member into and out of said first position to render said second heater effectual and ineffectual respectively, and other means operable as an incident to the movement of said damper into and out of said second position respectively to interrupt and resume the supply of heating medium to said first mentioned heater.

3. In a temperature control system, the combination of a casing having inlet and outlet openings, a heater having a coil adapted to be supplied with heating fluid, a damper movable between one position in which all of the air flowing through said casing passes through said heater and a second position in which substantially all of the air is by-passed around the heater, an electrically driven power operator for moving said damper variable distances in opposite directions between said positons, a thermostat responsive to changes in the temperature of the heated air and arranged to control said operator to determine the direction and extent of movement of said damper, a valve controlling the flow of fluid to said heater, an electrically driven power operator for said valve, a switch closed as an incident to the movement of said damper into said second position to initiate operation of said second operator in a direction to close said valve, a second switch closed as an incident to movement of said damper out of said second position to initiate operation of said second operator in a direction to open said valve, and means operated by said second operator to terminate each cycle of operation thereof independently of the switch initiating such cycle.

4. In a temperature control system, the combination of a casing having inlet and outlet openings, a heater within said casing, a damper movable between two limit positions to determine the proportion of air passing through said heater and by-passed around the heater, an electrically driven operator for moving said damper in opposite directions, a thermostat responsive to the temperature of the air to be controlled and controlling said operator to determine the direction and extent of movement of the damper by said operator, a valve controlling the flow of heating fluid to said heater, a power operator associated with said valve and adapted to execute successive operating cycles of fixed length during which said valve is alternately opened and closed, and means responsive to the movement of said damper and operable to initiate successive valve-closing and valve-opening cycles of said last mentioned operator as incidents to the movements of said damper into and out of the limit position in which substantially all of the air passing through said casing is by-passed around said heater.

5. In a temperature control system, the combination of a source of heat, a valve member movable between open and closed positions to vary the amount of heat withdrawn from said source, a power operator for said valve member including an electric motor arranged to move said member toward and away from said open position, a thermostat controlling said operator, an auxiliary source of heat supply, an electrically driven power operator adapted to execute successive operating cycles of predetermined lengths during which said auxiliary source of heat supply is interrupted and rendered available alternately, switching means actuated by said first mentioned operator and acting in the approach of said member to said open position to initiate a cycle of said second operator rendering said auxiliary source of heat supply effectual, and switching means actuated from said first mentioned operator immediately upon movement of said member away from said open position to initiate a cycle of said second operator rendering said auxiliary source of heat supply ineffectual.

6. In a temperature control system, the combination of a casing adapted for the circulation of air therethrough, a heater within said casing to which the air passing through the casing may be subjected, a valve member movable between a position in which all of the air is subjected to the heater and a second position in which substantially none of the air is so subjected, a power driven operator for moving said member in opposite directions, a thermostat controlling said operator to determine the direction and extent of movement of said member, a second heater disposed outside of said casing, and means responsive to the movements of said member into and out of said first mentioned position to render said heater effectual and ineffectual respectively.

7. In a temperature control system, the combination of means providing a source of heat, means providing an auxiliary source of heat, a power driven operator having a driven member movable between two limit positions to determine the amount of heat supplied by said first mentioned source, a thermostat controlling said operator to determine the direction and extent of movement of said member, and means controlled from said operator and acting while said member is disposed between said positions to maintain said auxiliary source of heat supply ineffectual and to render such supply effectual upon movement of said member into a position in which said first mentioned source of said supply is fully utilized, said last mentioned means acting upon reverse movement of said member to interrupt the supply of heat from said auxiliary source.

8. In a temperature control system, the combination of a heater, a thermostat, a power operator controlled by said thermostat and having a driven element movable gradually through varying distances toward and away from an open position to variably regulate the amount of heat delivered by said heater, a second heater and a power operator for actuating the same, and means deriving motion from said first operator as an incident to the movement of said element into open position to initiate operation of said second operator for rendering said second heater effectual.

9. In a temperature control system, the combination of a valve member, a power operator driven by an electric motor for moving said valve member variable distances in opposite directions between two limit positions, a thermostat controlling the starting and stopping of said motor to determine the extent and direction of movement of said member, a second valve-member controlling the flow of a heating medium, an electrically driven operator for said second valve member arranged to execute successive operating cycles of predetermined length during which the flow of said heating medium is alternately interrupted and resumed by said second valve member, and switching means operated by said first mentioned operator as an incident to the movement of the first mentioned valve-member into and out of one of said limit positions to initiate two successive cycles of said second operator.

10. In a temperature control system, the combination of a valve member, a power operator for moving the member variable distances in opposite directions between two positions, a thermostat controlling said operator to determine the direction and extent of movement of said member, a second valve-member, a power operator for moving said second member in opposite directions including an electric motor, a pair of switches controlling the starting of said motor to initiate movement of said second member in one direction or the other depending on which of the switches is closed, and means actuated by said first mentioned operator for maintaining one of said switches closed and the other open during movement of the first mentioned member between said positions and then to open the closed switch and close the open switch as the member reaches one of said positions.

11. In a temperature control system, the combination of a valve member, a power operator for moving the member variable distances in opposite directions between two positions, a thermostat controlling said operator to determine the direction and extent of movement of said member, a second valve-member, a power operator for moving said second member in opposite directions, means actuated by said first mentioned operator and controlling said second operator independently of said thermostat to maintain said second valve member against movement while said first mentioned member is disposed between said first mentioned positions, said last mentioned means acting as an incident to the movement of said first mentioned member into one of said first mentioned positions to initiate movement of said second member by said second operator, 12. In a system of the character described, the combination of a power operator including an electric motor, a source of electric current, means providing two energizing circuits through said current source and the winding of said motor, said circuits when closed initiating different operating cycles of said operator and each including a control switch adjacent the motor and a second switch remote therefrom, means actuated by said motor for closing said adjacent switches alternately in successive cycles of the operator, means operated by said motor for terminating each of said cycles after a fixed movement of said motor, a second power operator, a member driven thereby, a sensitive control device controlling said second operator to cause slow and graduated movement of said member through varying distances toward and away from a predetermined position, and means actuated by said second operator to close one of said remote control switches as said member is moved into said predetermined position and to close the other remote switch as the member moves away from such position.

13. In a temperature control system, the combination of a valve-member, a reversible power operator for said member including a driven element having two limit positions and electric motor means having two windings for causing movement of said element in opposite directions, a thermostat selectively controlling the circuits through said windings to determine the direction and extent of movement of said member, a valve, a power operator therefor including an electric motor and a driven member having two rest positions in which said valve is respectively opened and closed, means associated with said second operator for terminating the successive cycles thereof with the driven member in the respective rest positions, and means operated from the driven element of said first operator to initiate successive cycles of said second operator as an incident to movement of said valve-member into and out of one of said limit positions.

14. In a system of the character described, the combination of a power operator having a driven member movable back and forth through varying distances toward and away from a predetermined position, a sensitive control device controlling said operator to determine the direction and extent of movement of said member, a second power operator having a driven member movable through predetermined distances in successive operating cycles of the operator, and means operated independently of said device by the movement of said first mentioned driven member into said position to initiate one of said cycles of said second operator and another of said cycles as said first mentioned driven member moves away from said position.

15. In a temperature control system, a valve member, an electrically driven operator for said member including a shaft connected to said member and movable in opposite directions between two limit positions, a thermostat controlling said operator to determine the direction and extent of movement of said shaft and thereby vary the degree of opening of said valve member, a heater, a valve controlling the flow of heating medium to said heater, an electrically driven operator for said second valve adapted to execute successive cycles of predetermined length during which the valve is alternately opened and closed, two switches each arranged when closed to initiate one cycle of said second operator, and means operated from said shaft for closing and opening one of said switches and opening and closing the other switch as the shaft moves into and out of one of said limiting positions.

16. In a temperature control system, the combination of a heat regulating device, a power operator for moving said device toward and away from a predetermined position including an electric motor and an oscillatory element driven thereby, a thermostat controlling said motor to cause slow and graduated movements of said device through varying distances, a second regulating device, a power operator therefor including an electric motor, switching means operated by said element as said first device moves into said position to initiate operation of said second motor and movement of said second device, and switching means operated by said element immediately upon movement away from said position to initiate operation of said second motor and another movement of said second device.

17. In a system of the character described, the combination of a power operator and a member arranged to be driven thereby between two positions, a sensitive control device for initiating operation of said operator to move said member varying distances and with slow and graduated motion in one direction or the other, a second power operator and a member arranged to be driven thereby, means deriving an actuating force from said first operator and acting to initiate operation of said second operator independently of said device and as an incident to movement of said first mentioned member into one of said positions, and means also operated by said first operator for initiating operation of said second operator to reverse the movement of said second mentioned member immediately upon movement of the first mentioned member out of said last mentioned position.

18. In a temperature control system, the combination of a casing having inlet and outlet openings, a heater within said casing, a damper within said casing movable in opposite directions to vary progressively the delivery of heat by said heater, a power operator for moving said damper in opposite directions thermostatically controlled in response to temperature changes and controlling said operator to determine the direction and extent of movement of said damper, a valve controlling the flow of heating fluid to said heater, a power operator associated with said valve and adapted to execute successive cycles of fixed length during which said valve is alternately opened and closed, and means acting upon a decrease in the rate of heat delivery to a predetermined point to initiate a valve-closing cycle of said second operator, said last mentioned means acting upon a subsequent increased demand for heat to initiate a valve-opening cycle of the second operator.

19. A system of the class described having, in combination, a regulating device, an electrically driven operator therefor having two windings selectively energizable to cause movement of said device at a slow and graduated rate in opposite directions and between two spaced predetermined positions, a sensitive control instrument governing the energization of said windings to cause said device to be moved back and forth varying distances between said positions, two independently operable power driven operators, and control means responsive to the movements of said first mentioned device by said electrically driven operator and operable upon movement of said device in one direction into one of said positions to initiate operation of one of said power operators and upon movement of said device in the opposite direction into said other position to initiate operation of the other power operator.

20. A system of the class described having, in combination, a regulating device, an electrically driven operator therefor having two windings selectively energizable to cause movement of said device at a slow and graduated rate in opposite directions and between two spaced predetermined positions, a sensitive control instrument governing the energization of said windings to cause said device to be moved back and forth varying distances between said positions, a second device to be moved in opposite directions, a power driven operator therefor, and control means operated upon movement of said first mentioned device into one of said positions to initiate operation of said power operator to move said second device in one direction, said control means acting upon reverse movement of said first mentioned device to initiate operation of said power operator for effecting reverse movement of said second device.

21. An air conditioning system having, in combination, a regulating device movable in opposite directions, an electric motor driven operator operatively connected to said device and having two windings selectively energizable to cause slow and graduated movements of said device in opposite directions, an automatic control instrument having an independently movable element sensitive to changes in air conditions and arranged to control the selective energization of said windings whereby to cause said device to be moved varying distances back and forth between limit positions, a second device, an independently operable electrically driven operator for said second device, and means responsive to the movement of said first mentioned device by said first operator and acting upon movement of this device into a predetermined position to initiate operation of said second operator and actuation of said second device thereby while maintaining said second device idle during the normal movements of said regulating device between said positions.

22. An air conditioning system having, in combination, a regulating valve device, a power driven actuator therefor operable, when active, to impart slow and graduated movements to said device in opposite directions between two predetermined positions of the latter, said actuator acting, when rendered inactive with said device in an intermediate position, to maintain the position of the device, an automatic control instrument having an independently operable sensitive element governing the application of motive power to said actuator for moving said device varying distances back and forth between said positions, a second device for regulating the flow of a different medium than said first mentioned device, an independent power driven operator for said second device adapted, when idle, to maintain the position of said second device, and control means operable automatically in timed relation to the movement of said first mentioned device into one of said positions to initiate operation of said operator and movement of said second device thereby while maintaining said device idle during the normal regulating movements of said valve device.

23. An air conditioning system having, in combination, a damper mounted for movement in opposite directions to regulate variably the flow of an air conditioning medium, a power driven operator operatively connected to said damper for imparting slow and graduated movements thereto in opposite directions, an automatic control instrument having an independently movable element sensitive to changes in the temperature of the air conditioned by changes in the condition of the air regulated by said damper and arranged to control the operation of said operator selectively to cause said damper to be moved varying distances back and forth between limit positions, a device for tempering the air, an independently operable actuator for said second device, and means responsive to the movement of said damper by said operator and acting upon movement of the damper into a predetermined position to initiate operation of said actuator and movement of said second device thereby while maintaining said second device idle during the normal regulating movements of said damper between said positions.

24. A system of the general character described having, in combination, a regulating device movable in opposite directions, a sensitive control instrument, an electric motor driven operator for said device having windings controlled selectively by said instrument to cause slow and graduated movement of the device varying distances in opposite directions between two limit positions and to maintain the position of the device after one of said positions has been reached, an air conditioning mechanism normally active while said first device is disposed between said limit positions, an electrically driven operator for actuating said mechanism, and means operating as an incident to movement of said first mentioned device into one of said positions to control said second operator and cause said mechanism to be rendered inactive and by reverse movement of said first device to initiate operation of said second operator to render said mechanism active.

25. An air conditioning system having, in combination, a valve member movable back and forth in opposite directions between fully open and closed positions, a regulating device for controlling the flow of a different medium than said member, a sensitive control instrument, and electric motor driven mechanism controlled by said instrument to cause slow and graduated movement of said member back and forth through varying distances between said positions while maintaining a fixed position of said device, said mechanism acting upon and in timed relation to the movement of said valve member into one of said positions under the control of said instrument to maintain such position of the valve member and initiate operation of said device out of said fixed position.

26. An air heating system having, in combination, heating means comprising a primary heater and means for inducing the flow of air in heat-exchanging relation past said heater and discharging a current of the heated air into the space to be heated, a device for regulating the amount of heat carried by said air current, means including a thermostat responsive to temperature changes of the air in said space operable to govern said device and thereby vary progressively the heating capacity of said heating means in accordance with the heating requirements in said space, a secondary heater for delivering heat by direct radiation to said space, and means operating independently of temperature fluctuations in said space and controlling said secondary heater to maintain the latter substantially ineffectual until the heating capacity of said heating means has been increased to a predetermined value and to maintain the secondary heater effectual for supplying additional heat to said space while said heating means is operating at or above said predetermined capacity.

27. An air heating system having, in combination, a primary heater for delivering heat to the space to be heated, a device movable back and forth to vary the heating capacity of said heater relative to a predetermined maximum, a thermostat controlling said device to vary the capacity of said heater progressively and maintain the same at values determined by the heating requirements in said space, a normally inactive secondary heater for delivering heat to said space, and means operable independently of temperature fluctuations in said space to turn on said secondary heater and maintain the same effectual when said primary heater is operating substantially at said maximum capacity.

28. An air heating system having, in combination, a primary heater arranged to supply heat to a space to be heated, a regulating device operable progressively between two positions to vary the amount of heat supplied by said heater, thermostatic means controlling said device to increase progressively the rate of heat delivery by said heater when the space temperature is below a predetermined value and said device is between said positions, said thermostatic means acting on said device to decrease the effectiveness of the heater when the space temperature is above a predetermined value and the device is between said positions, a secondary heater for supplying heat to said space, and means controlling the operation of said secondary heater in accordance with the rate of delivery of heat by said primary heater and acting to maintain the secondary heater substantially ineffectual until said rate has increased to a predetermined point and then to render the secondary heater effectual.

DUNCAN J. STEWART.